US009721270B2

(12) United States Patent
Speeney et al.

(10) Patent No.: US 9,721,270 B2
(45) Date of Patent: Aug. 1, 2017

(54) INTEGRATING COMMUNICATIONS SERVICES WITH PERSONALIZED SOCIAL NETWORKS

(75) Inventors: Joseph Anthony Speeney, Basking Ridge, NJ (US); Ted Charles Stine, Suwanee, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 876 days.

(21) Appl. No.: 13/462,028

(22) Filed: May 2, 2012

(65) Prior Publication Data
US 2013/0297687 A1 Nov. 7, 2013

(51) Int. Cl.
*G06Q 30/02* (2012.01)
*G06Q 50/00* (2012.01)

(52) U.S. Cl.
CPC ......... *G06Q 30/0241* (2013.01); *G06Q 50/01* (2013.01)

(58) Field of Classification Search
CPC ..... H04L 67/22; H04L 67/306; H04N 21/251; G06Q 50/01
USPC ................... 709/204, 206; 705/14; 725/109
See application file for complete search history.

(56) References Cited

U.S. PATENT DOCUMENTS

| 8,494,123 B2* | 7/2013 | Pitschel | H04M 3/4285 379/88.11 |
| 8,782,121 B1* | 7/2014 | Chang | H04L 67/104 709/202 |
| 2001/0012335 A1* | 8/2001 | Kaufman | H04M 3/4285 379/67.1 |
| 2004/0225752 A1* | 11/2004 | O'Neil | H04L 29/06 709/246 |
| 2006/0128365 A1* | 6/2006 | Kamdar | H04M 3/428 455/414.3 |

(Continued)

OTHER PUBLICATIONS

U.S. App. No. 13/307,839, to Ted Charles Stine et al., filed Nov. 30, 2011.

(Continued)

*Primary Examiner* — Uzma Alam
(74) *Attorney, Agent, or Firm* — Greenblum & Bernstein, P.L.C.

(57) ABSTRACT

Communications services are integrated with personalized selections of content and with social networks. A computer of an interactive system determines that an initiating communications party is associated with a personal content account external to the communications service provider. Personalized selections of content are provided from the personal content account to the initiating communications party during the communications session. The computer of the interactive system may also determine an agent to assign to the communication session in accordance with feedback received from communications parties based on previous communications between the communications parties and agents of the communications service provider. The agent to assign to the communications session first can be assigned in accordance with the feedback received from the communications parties based on previous communications between the communications parties and agents of the communications service provider.

14 Claims, 14 Drawing Sheets

(56) References Cited

U.S. PATENT DOCUMENTS

| | | | | |
|---|---|---|---|---|
| 2007/0004384 A1* | 1/2007 | Anupam | ............ | H04M 3/4285 455/414.1 |
| 2008/0205620 A1* | 8/2008 | Odinak | ............... | H04M 3/4285 379/215.01 |
| 2008/0208692 A1* | 8/2008 | Garaventi | ............ | G06Q 20/102 705/14.69 |
| 2009/0175429 A1* | 7/2009 | Cohen | ................ | H04Q 11/0435 379/201.02 |
| 2010/0169463 A1* | 7/2010 | Harper | ................... | G06F 21/10 709/219 |
| 2010/0239078 A1* | 9/2010 | Sweeney | ............. | H04M 3/4285 379/101.01 |
| 2010/0254520 A1* | 10/2010 | Oren | ....................... | G06Q 30/02 379/88.13 |
| 2012/0051532 A1* | 3/2012 | Pande | ................... | H04M 3/493 379/201.05 |
| 2012/0179980 A1* | 7/2012 | Whalin | .................. | G06Q 10/10 715/753 |
| 2012/0221419 A1* | 8/2012 | Woxblom | ............. | G06Q 30/02 705/14.73 |
| 2012/0330734 A1* | 12/2012 | Brown | ................... | G06Q 30/02 705/14.5 |
| 2013/0291037 A1* | 10/2013 | Im | ...................... | H04N 21/4788 725/109 |
| 2014/0229270 A1* | 8/2014 | Rashwan | ........... | G06Q 30/0641 705/14.43 |
| 2015/0304375 A1* | 10/2015 | Dhillon | ............... | H04L 65/4007 370/259 |

OTHER PUBLICATIONS

U.S. App. No. 13/315,711, to Ted Charles Stine et al., filed Dec. 9, 2011.

U.S. App. No. 13/307,344, to Ted Charles Stine et al., filed Nov. 30, 2011.

* cited by examiner

INTEGRATING COMMUNICATIONS SERVICES WITH PERSONALIZED SOCIAL NETWORKS

BACKGROUND

1. Field of the Disclosure

The present disclosure relates to communications services. More particularly, the present disclosure relates to enhancing communications services for users with content and features reflective of the users' individual entertainment tastes and personal relationships.

2. Background Information

Audio/visual advertising and entertainment is sometimes provided on elevators or during an on-hold period before or in the midst of a communications service. Audio/visual advertising and entertainment may be provided to any elevator rider or individual before or in the midst of a communications service, and the advertising or entertainment experience ends when the elevator rider exits the elevator or when the communications service begins or restarts.

BRIEF DESCRIPTION OF THE DRAWINGS

The present disclosure is further described in the detailed description that follows, by reference to the noted drawings by way of non-limiting examples of embodiments, in which like reference numerals represent similar features in drawings, and in which.

DETAILED DESCRIPTION

In view of the foregoing, the present disclosure, through one or more of its various aspects, embodiments and/or specific features or sub-components, is thus intended to bring out one or more of the advantages as specifically noted below.

Integrating communications services with personalized content selections as described herein provides entertainment based on information derived from personal content accounts. A personal content account is a personal account with content owned by, licensed to, created by, created for, addressed to, addressed by, sent to or sent by an individual responsible for opening and maintaining the account. A personal content account may be an email account, social media account, music account, photography account, video account, or other account with content reflective of creativity that might entitle the content to copyright protection.

Integrating communications services with social networks as described herein provides communications service agents selected based on information derived from social networks. The information is derived first by determining the social network identity of a requester, and then determining whether contacts of the requester have previously interacted with a communications service provider and left feedback that can be used in finding an agent to assist the requester.

In embodiments described herein, information derived permissively from private personal content accounts or automatically from public or private personal content accounts, including social media accounts, is used to enhance a communications service for the requesters responsible for the personal content accounts. In any embodiment, the use of personal accounts such as a music account, video account or social media account, can be integrated with a communications service even when the person associated with the account is communicating with the communications service for the first time.

Figure 1:
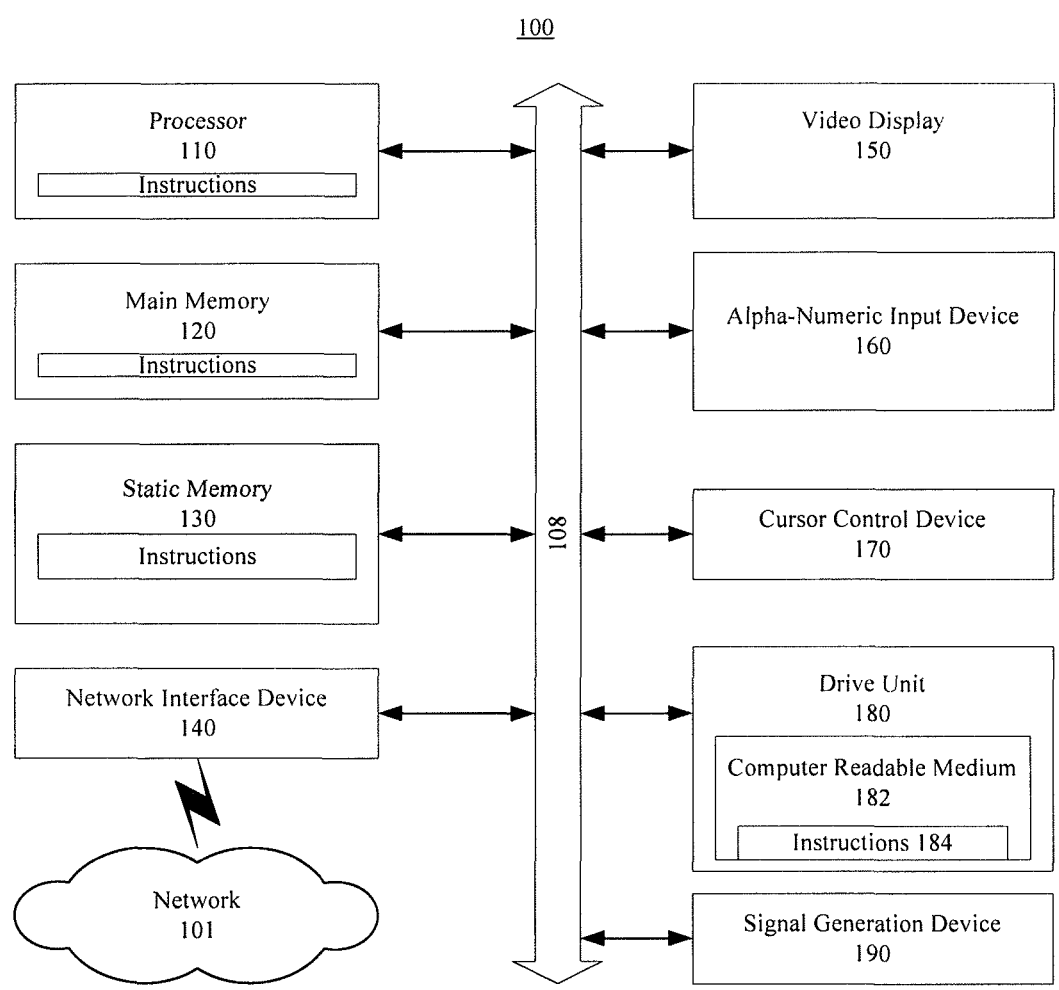
FIG. 1 shows an exemplary general computer system that includes a set of instructions for integrating communications services with personalized content selections and social networks, according to an aspect of the present disclosure.

FIG. 1 is an illustrative embodiment of a general computer system, on which a method of integrating communications services with personalized content selections and social networks can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a desktop computer, a server computer, a tablet personal computer (PC), a personal digital assistant (PDA), a mobile device, a laptop computer, a communications device, a wireless telephone, a control system, a personal trusted device, a web appliance, a network router, switch or bridge, a user communications device, a network computer, a cloud computer, an interactive system computer, a personalized content cloud coordination computer, an agent system, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

In embodiments described and shown in relation to FIGS. 2-8 herein, computers may be shown to have processors and memories as correlations to the general computer system of FIG. 1. In the embodiments described herein, data and instructions stored temporarily or permanently in memories is executed or otherwise processed by a processor to provide the integration of communications services with personalized content selections and social networks described herein.

Figure 2:
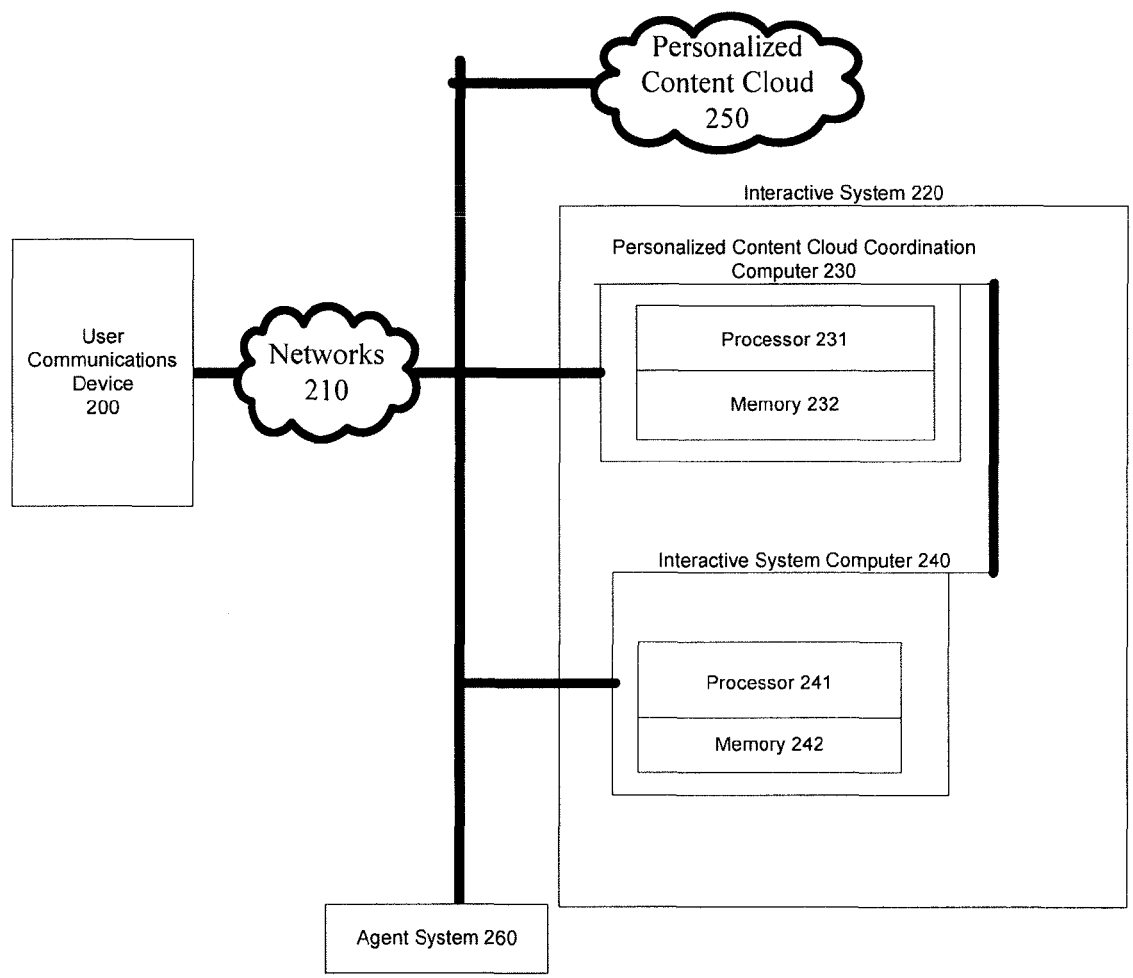
FIG. 2 shows an exemplary network for integrating communications services with personalized content selections and social networks, according to an aspect of the present disclosure.

FIG. 2 shows an exemplary network for integrating communications services with personalized content selections and social networks, according to an aspect of the present disclosure. In FIG. 2, a user communications device 200 may be any type of networked communications device known to communicate over networks, including smart phones and mobile and stationary computers. The user communications device 200 communicates over networks 210 with an interactive system 220 as well as with a personalized content cloud 250 and an agent system 260. The networks 210 may be analog or digital and wired or wireless networks, including combinations of different types of networks, by which users can communicate with remote interactive systems, cloud systems and agent systems.

The personalized content cloud 250 and any other cloud described herein includes a combination of devices with processors and/or memory to process and store digital content and information associated with the content such as ownership and licensing information. The personalized content cloud 250 and any other cloud described herein may store content on behalf of the user and/or on behalf of the provider of the interactive system 220 and agent system 260.

In FIG. 2, the personalized content cloud 250 may be a cloud-based system that serves as a repository of content owned by and/or licensed to the user that uses user communications device 200. The personalized content cloud 250 may allow access to the content to the user using communications device 200 and/or another communications device that can be used to retrieve the content. The content may be made available to the user or a designee using only specified devices such as communications device 200, or may be available to a user or a designee using any communications device from which the user or designee can log into an account so as to access the content. In FIG. 2, the personalized content cloud 250 may also be a cloud-based system that tracks which content is owned by and/or licensed to the user, even when the content is stored on a user communications device 200 or another user communications device. In either circumstance in which the content is owned by or licensed to the user, the content may be stored in the personalized content cloud 250 as a service by, for example, a provider of the content.

In FIG. 2, the personalized content cloud 250 may also be a cloud-based system that serves as a repository of content owned by and/or licensed to the provider of the interactive system 220 and/or agent system 260. In the circumstance where information of a user's entertainment preferences is determined from, e.g., the user directly or indirectly by analyzing information on the user communications device 200, content owned by and/or licensed to the provider can be played to the user over the networks as a form of entertainment. In this circumstance, the content played to the user may be an identical copy or similar version of content owned by or licensed to the user, or the content played to the user may be entirely different content that is still nonetheless identified based on content owned by or licensed to the user. For example, a communications service provider may identify a user's favorite artists, or a genre of music favored by a user, and then play new music from the artists or genre that the user does not already own or license.

In FIG. 2, the user of the user communications device 200 uses the user communications device 200 to contact an interactive system 220, such as by dialing a phone number on a phone or entering a website address into a browser. The interactive system 220 may include an interactive voice response system as interactive system computer 240 with processor 241 and memory 242. The interactive system 220 may alternatively include a web server as interactive system computer 240 with processor 241 and memory, where the web server provides a website to interact with a user using the user communications device 200.

The interactive system computer 240 interacts with the user using user communications device 200 in accordance with a script or program so as to provide information to and request information from the user. The user's experience with the interactive system computer 240 varies in comparison to the experience of another user, in that the stages in the communications service differ for the different users in accordance with the script and depending on differences in information, instructions and requests provided by the different users. The script may be stored in memory 242 and executed by processor 241. The script may also indicate to contact the personalized content cloud coordination computer 230 during a pause before or during a communications service, and try to find a way to entertain the user during the pause. During interaction with the interactive system computer 240, the user using user communications device 200 may provide information, instructions and requests as input via dual tone multi-function (DTMF) tones by pressing keys on a keypad, voice input by speaking into a receiver, and/or data by pressing keys on a keyboard or by moving a cursor using a mouse and selecting options using a button on the mouse. The interactive system computer 240 executes the script in accordance with information, instructions and requests provided by the user, and integrates the functionality of the personalized content cloud coordination computer 230 into the communications service provided by the interactive system computer 240.

The user enters the communications address such as phone number or web address of the interactive system 220, and the interactive system computer 240 interacts with the user in the communications session by executing instructions in memory 242 using processor 241. The interactive system computer 240 receives and interprets the input from the user, and provides responses to the user communications device 200. The responses may include prerecorded or computer-generated audio sounds such as voice information, or visual information such as text or images on a web page.

Among the information the interactive system computer 240 may obtain is a communications address or social network identification of the user. Communications addresses may include email addresses and phone numbers. Social network identifications may include user names or other login identifications as well as passwords used to log in to a social network. The information obtained from the user can be used to identify and access information of a personal content account or social network account.

For the personal content account, the information from the user may be used to identify content purchased by or licensed to the user, including songs, podcasts, videos, television shows, and movies. The information from the user for a personal content account may also be used to identify descriptive information used to describe the content, such as: album name, album artist, album rating, artist name, beats per minute, bit rate, category, comments, composer, date added, date modified, description, disk number, episode ID, episode number, equalizer, genre, grouping, last played, last skipped, number of times the content has been played, purchase date, rating, release date, sample rate, season, show, size, number of skips, track number, year of publication, the relative popularity of the content in the user account relative to other content in the user account, items marked favorite by the user or other types of rankings of content by the user, whether the content is purchased or licensed, digital rights management information for the content, and format in which the content is encoded.

For the social network account, the information obtained from the user may be used to identify only public information of the user such as public information associated with the social network account. Alternatively for the social network account, the information obtained from the user may be used to identify restricted or private information of the social network account if the user agrees to allow access to the restricted or private information. Public information may include identifications of friends, whereas restricted or private information may include private messages sent to the user and the history of content posted by the user to other social network accounts including individual and group accounts.

For the personal content account, the user may be prompted for permission to access the personal content account with a prompt such as audibly or visually asking "while you are waiting, would you like to hear your favorite music from your music account"? For the social network account, the user may be prompted for permission to access the social network account with a prompt such as audibly or visually asking "while you are waiting, would you like to review recent updates and messages on your social network account"?

If the user responds affirmatively for the personal content account, personalized content cloud coordination computer 230 may log into and search a specified personal content account of the user to identify the most played or most highly rated music or musician. In the embodiment of FIG. 2, the content and/or information descriptive of the content or usage of the content is stored normally in the personalized content cloud 250. After identifying content to play, the personalized content cloud coordination computer 230 may retrieve the content from the personalized content cloud 250, and play the content to the user. Alternatively, when the personalized content cloud 250 tracks the use of content by the user, the personalized content cloud coordination computer 230 may identify the most highly rated content from information in the personalized content cloud 250. The personalized content cloud coordination computer 230 may also identify the most highly rated content by contacting a personalized content program on the user communications device 200 when the personalized content program on the user communications device 200 tracks the use of content by the user.

Therefore, the content may be stored either on the user communications device 200 or in the personalized content cloud 250. The content may be played to the user in accordance with user and usage information tracked by programs on either the user communications device 200 or in the personalized content cloud 250. The analysis and coordination and selection of content based on analysis of the content or related information can be performed by the personalized content cloud coordination computer 230. Additionally, in the event that reproduction of the content in accordance with instructions from the interactive system 220 is not permissible for copyright purposes, the interactive system 220 may separately license the content directly so as to have the rights to play the content back to the user during pauses or on-hold periods in the communications service.

When appropriate, the interactive system 220 can transfer a call to an agent system 260, such as a human agent at a workstation when a human agent is needed or even just requested to complete the communications service. The content played to the user may be played while waiting for an agent at agent system 260 to become available, or may be played to the user even when an agent is available if the user elects to continue the entertainment, such as when the content is new content from a favorite entertainer of the user.

Figure 3:
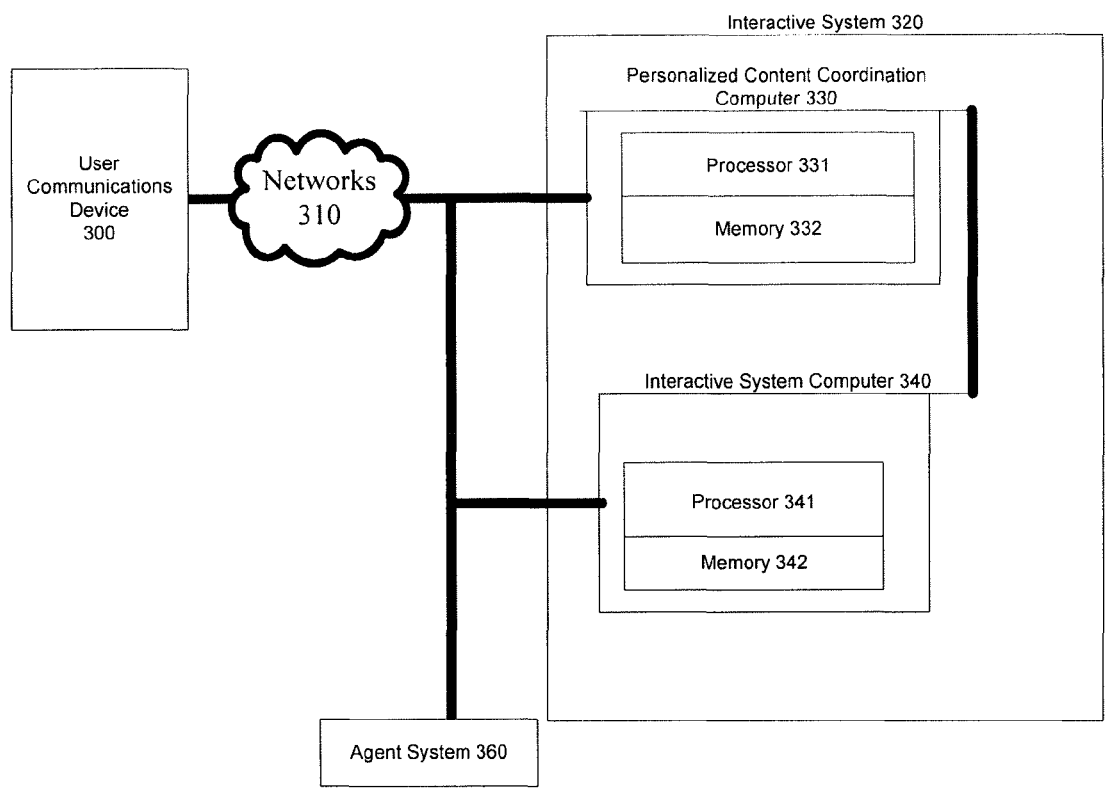
FIG. 3 shows another exemplary network for integrating communications services with personalized content selections and social networks, according to an aspect of the present disclosure.

FIG. 3 shows another exemplary network for integrating communications services with personalized content selections and social networks, according to an aspect of the present disclosure. In FIG. 3, a personalized content cloud is not used as a repository of content or information related to content as in FIG. 2. Rather, in FIG. 3, content and information related to content is stored on the user communications device 300. In the embodiment of FIG. 3, the user may be entertained with content from their own account and stored on their own device, where the presentation of the content is coordinated with a communications service so that the user is entertained before the communications service or during pauses in the communications service.

In FIG. 3, a user communications device 300 may be any type of networked communications device known to communicate over networks, including smart phones and mobile and stationary computers. The user communications device 300 communicates over networks 310 with an interactive system 320 as well as with agent system 360.

In FIG. 3, the user communications device 300 serves as a repository of content owned by and/or licensed to the user that uses user communications device 300. The user communications device 300 may allow access to the content to the user using communications device 300 and/or another communications device that can be used to retrieve the content. In FIG. 3, the user communications device 300 may also track which content is owned by and/or licensed to the user, even when the content is stored on another user communications device.

In FIG. 3, when information of a user's entertainment preferences are determined from, e.g., the user directly or the user communications device 300, content owned by and/or licensed to the user can be played to the user as a form of entertainment before during pauses in providing the communications service. The personalized content coordination computer 330 with processor 331 and memory 332 may coordinate which content to play to the user using user communications device 300 during pauses in the communications service provided by interactive system computer 340 with processor 341 and memory 342, or when waiting for an agent to become available at agent system 360. Access to the personal content account is authorized by the user, when necessary, and the personalized content coordination computer 330 logs into the personal content account. The personalized content coordination computer 330 can then either retrieve content and information for analysis at the personalized content coordination computer 330, or download an analysis program to the user communications device 300 and receive analysis results as data.

In FIG. 3, the user of the user communications device 300 uses the user communications device 300 to contact an interactive system 320, such as by dialing a phone number or visiting a website. The interactive system 320 may include an interactive voice response system implemented on interactive system computer 340 with processor 341 and memory 342. The interactive system 320 may also include a web server as interactive system computer 340 with processor 341 and memory 342, where the web server provides a website to interact with a user using the user communications device 300. The interactive system computer 340 interacts with the user using user communications device 300 in accordance with a script or program so as to provide information to and request information from the user. The user using user communications device 300 may provide information, instructions and requests as input via dual tone multi-function (DTMF) tones by pressing keys on a keypad, voice input by speaking into a receiver, and/or data by pressing keys on a keyboard or by moving a cursor using a mouse and selecting options using a button on the mouse.

The user enters the communications address such as phone number or web address of the interactive system 320, and the interactive system computer 340 interacts with the user in the communications session by executing instructions in memory 342 using processor 341. The interactive system computer 340 receives and interprets the input from the user, and provides responses to the user communications device 300. The responses may include prerecorded or computer-generated audio sounds such as voice information, or visual information such as text or images on a web page.

An example of use for the embodiment of FIG. 3 is for a user who calls a financial institution to obtain a service that ultimately requires personal assistance with an agent with rare skills or knowledge, and who is unavailable for an extended period. During the interaction with the interactive system computer 340, the interactive system computer 340 determines that the agent will ultimately be required, but is unlikely to be available for an extended period of, e.g. 30 minutes. The interactive system computer 340 then requests personalized content coordination computer 330 to interact with the user's device to access an iTunes account and search for a favorite artist. The interactive system computer 340 advised the user that music from the user's account on user communications device 300 will be played until the agent is available. In other embodiments where content is stored in a cloud, such as in the embodiment of FIG. 2, the interactive system computer 340 could identify entertainment content for the user that is not already on the user's device, but which the user might enjoy such as new music from a favorite artist. The music from the cloud is then played as entertainment until the agent is available.

Figure 4:
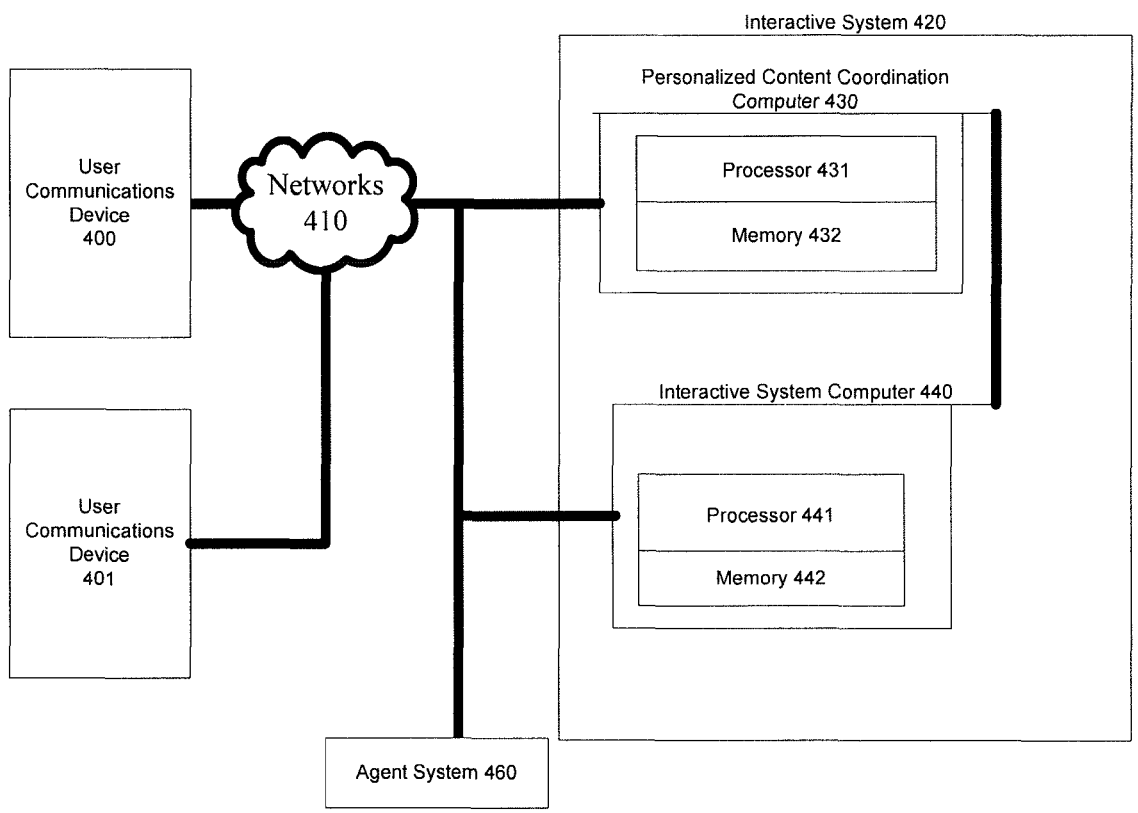
FIG. 4 shows another exemplary network for integrating communications services with personalized content selections and social networks, according to an aspect of the present disclosure.

FIG. 4 shows another exemplary network for integrating communications services with personalized content selections and social networks, according to an aspect of the present disclosure. In FIG. 4, multiple user communications devices 400 and 401 are provided. In the embodiment of FIG. 4, the user communications devices 400 and 401 are associated together, such as when a personal content account and/or social media account is accessible from both such user communications devices 400 and 401. An example of such user communications devices is when a user has a smart phone and a desktop computer, and content for the social media account is stored on the desktop computer but can be retrieved and accessed from the smart phone. When the smart phone contacts and interacts with the interactive system 420 across networks 410, the personalized content coordination computer 430 with processor 431 and memory 432 determines the personal content account and/or social media account, and accesses the content on the desktop computer to play to the user using the smart phone. Access may be provided by the user providing a log in and password and the personalized content coordination computer 430 sending an analysis program to analyze the personal content account, or by the personalized content coordination computer 430 retrieving content and/or information for the content for analysis. In this way, the user using the smart phone among the user devices 400, 401 can interact with the interactive system computer 440 with processor 441 and memory 442, and be entertained with content retrieved from the desktop computer among the user devices 400, 401. The personalized content coordination computer 430 coordinates the interaction with the user by the interactive system computer 440 and the presentation of entertainment content from the desktop computer among the user communications devices 400, 401.

When the smart phone contacts and interacts with the interactive system 420 across networks 410, the personalized content coordination computer 430 with processor 431 and memory 432 determines the personal content account and/or social media account, and accesses the content on the desktop computer to play to the user using the smart phone. In this way, the user using the smart phone among the user devices 400, 401 can interact with the interactive system computer 440 with processor 441 and memory 442, and be entertained with content retrieved from the desktop computer among the user devices 400, 401. The personalized content coordination computer 430 coordinates the interaction with the user by the interactive system computer 440 and the presentation of entertainment content from the desktop computer among the user communications devices 400, 401.

Figure 5:
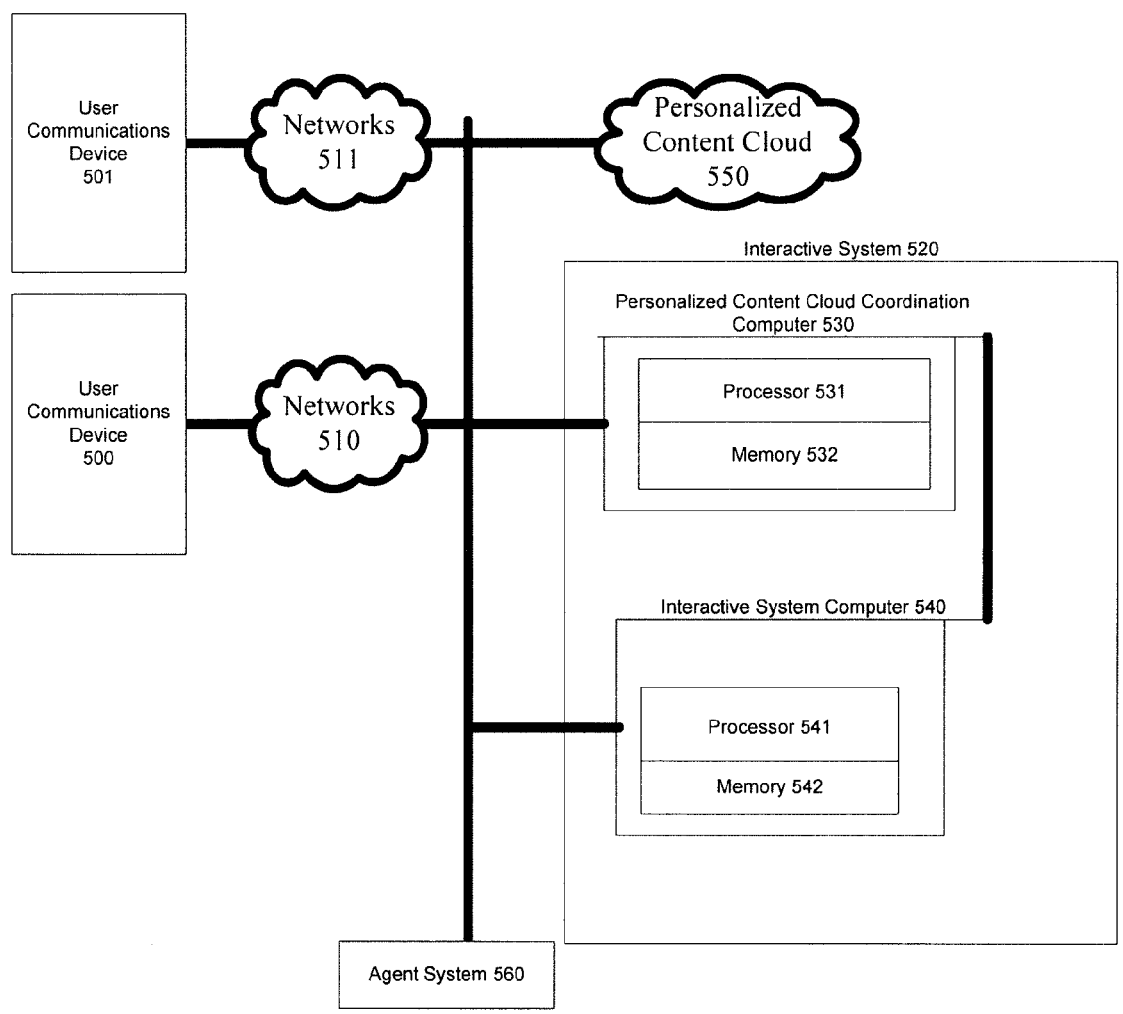
FIG. 5 shows another exemplary network for integrating communications services with personalized content selections and social networks, according to an aspect of the present disclosure.

FIG. 5 shows another exemplary network for integrating communications services with personalized content selections and social networks, according to an aspect of the present disclosure. In FIG. 5, multiple user communications devices 500 and 501 are provided. However, content and/or information related to content is also stored in personalized content cloud 550. In the embodiment of FIG. 5, the user communications devices 500 and 501 are associated together, such as when a personal content account and/or social media account is accessible from both such user communications devices 500 and 501. In this example, a caller calling from a smart phone among user communications devices 500 and 501 may contact interactive system 520 and interact with interactive system computer 540. Personalized content cloud coordination computer 530 with processor 531 and memory 532 can be used to determine that the user has a personal content account and/or social media account associated with a library of content on the other of user communications devices 500 and 501. In FIG. 5, the library on the other of user communications devices 500 and 510 can be checked, and the provider of interactive system 520 can then play content licensed to or owned by the provider of interactive system 520 and stored in personalized content cloud 550.

In this embodiment, a user may be entertained by licensed or owned content from the personalized content cloud, where the content is determined based on the user's personal content account but is not already owned by or licensed to the user. For example, a user may be entertained by new music from a favorite entertainer while on hold with an interactive voice response system provided as interactive system computer 540 with processor 541 and memory 542. Of course, the user may also be entertained with content already owned by or licensed to the user, but provided from the content owned by or licensed to the provider in the personalized content cloud 550 so as to ensure no copyrights are infringed. In either circumstance, the content is determined from the user's own personal content account or social media account, from the actual content or from information associated with the content.

Another feature in FIG. 5 is that user communications device 501 communicates across networks 511, whereas user communications device 500 communicates across networks 510. The separate network are specifically illustrated to show that different user devices may communicate across different, dissimilar networks and still interact with interactive system 520 and personalized content cloud 550. Examples of such different, dissimilar networks are cellular GSM and CDMA networks as compared to broadband wired IP or MPLS networks. Once content is provided, the interactive system 520 can transfer the user to a waiting agent on agent system 560.

Figure 6:
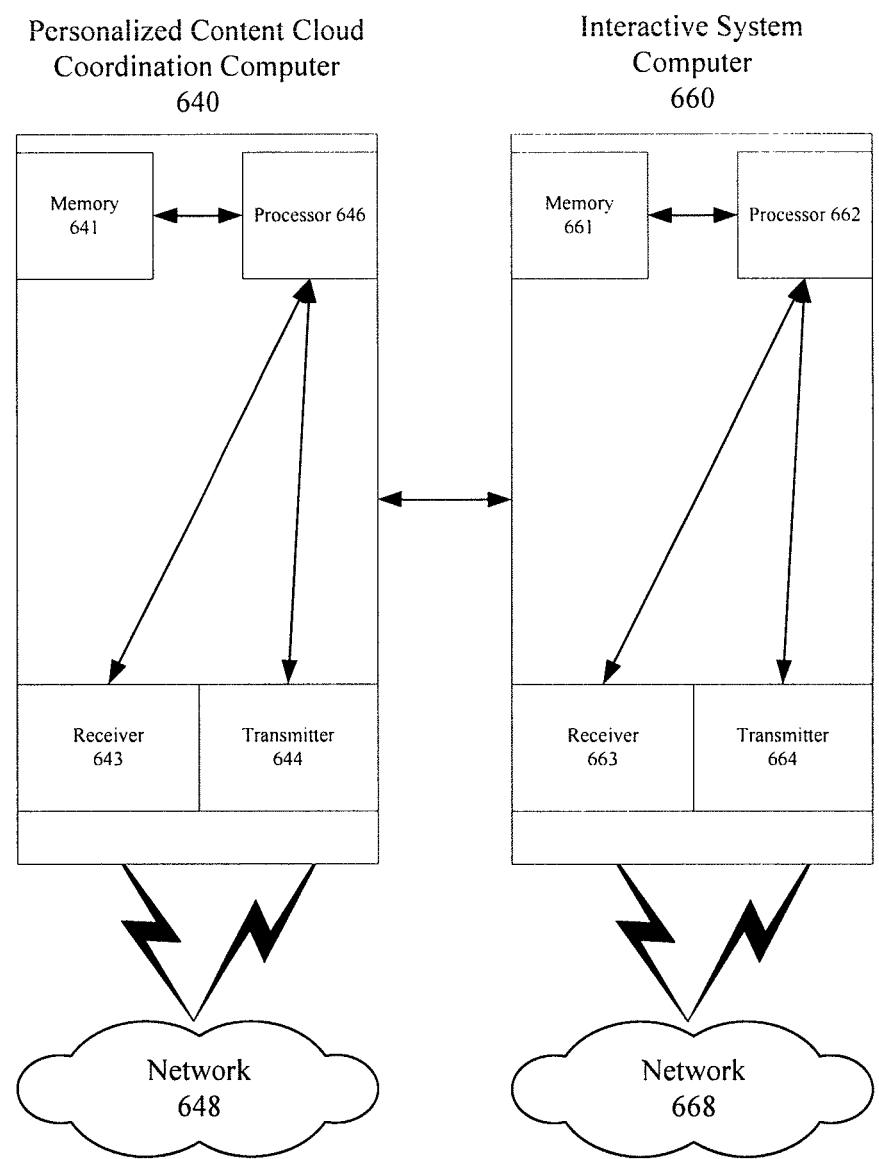
FIG. 6 shows another exemplary network that includes a personalized content cloud coordination computer and an interactive system computer for integrating communications services with personalized content selections and social networks, according to an aspect of the present disclosure.

FIG. 6 shows another exemplary network that includes a personalized content cloud coordination computer and an interactive system computer for integrating communications services with personalized content selections and social networks, according to an aspect of the present disclosure. The embodiment of FIG. 6 is equally applicable to embodiments where a personalized content coordination computer is provided instead of a personalized content cloud coordination computer.

FIG. 6 shows a personalized content cloud coordination computer 640 and an interactive system computer 660 for integrating communications services with personalized content selections and social networks. In FIG. 6, personalized content cloud coordination computer 640 includes a memory 641, a processor 646, a receiver 643 and a transmitter 644. The receiver 643 and transmitter 644 communicate over network 648. The processor 646 processes instructions and data from the receiver 643 and memory 641, and forwards instructions or data to transmitter 644 for transmission or to memory 641 for storage. In FIG. 6, interactive system computer 660 includes a memory 661, a processor 662, a receiver 663 and a transmitter 664. The receiver 663 and transmitter 664 communicate over network 668. The processor 662 processes instructions and data from the receiver 663 and memory 661, and forwards instructions or data to transmitter 664 for transmission or to memory 661 for storage.

The personalized content cloud coordination computer 640 may be a system for identifying, automatically or with permission, personal content accounts and/or social media accounts used by a user, and analyzing content or information about content in the personal content accounts and/or social media accounts to determine how to present entertainment options to the user while awaiting an agent or during pauses in a communications service. In the embodiments of FIG. 2 through 5, personalized content or information relating to personalized content of personal content accounts may be stored in personalized content clouds 250 or 550 where provided. Personalized content or information relating to personalized content of personal content accounts may also be stored on user communications devices 200, 300, 400, 500, 401 and 501. The personalized content cloud coordination computer 640 and interactive system computer 660 communicate with each other in the embodiment of FIG. 6. The servers may communicate over a communications network, or may alternatively be implemented on the same physical computer. The personalized content cloud coordination computer 640 may coordinate the activities of the interactive system computer 660 so as to present content as entertainment during pauses in services provide by interactive system computer 660. The personalized content cloud coordination computer 640 may also receive requests and instructions first received by interactive system computer 660 from user devices to determine directly how a user wishes to be entertained if at all.

The computers 640 and 660 in FIG. 6 interact in order to provide the communications service in the manner described herein. The interactive system computer 660 executes the interactive script to interact with the user, and determine when to request personalized content cloud coordination computer 640 to find a way to entertain the user. The personalized content cloud coordination computer 640 will then identify personal content accounts and, if authorized, search for content and information that can be used to entertain the user or that can be used to find a way to entertain the user. The entertainment may be provided only during pauses when the communications service is not being provided such that the pauses define the entertainment time, or may be provided fully so that the entertainment content defines the entertainment time.

Figure 7:
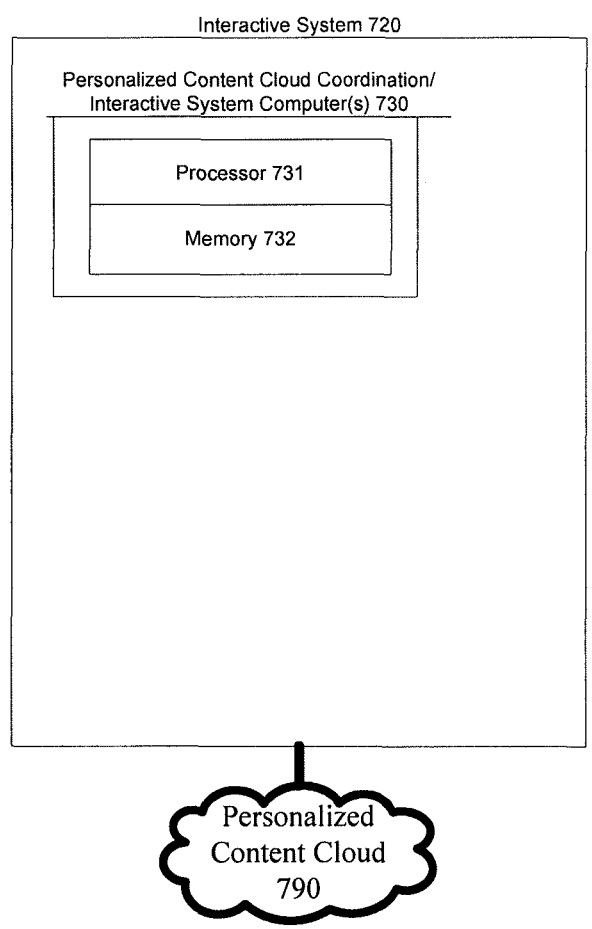
FIG. 7 shows an exemplary system for integrating communications services with personalized content selections and social networks, according to an aspect of the present disclosure.

FIG. 7 shows an exemplary system for integrating communications services with personalized content selections and social networks, according to an aspect of the present disclosure. In FIG. 7, an interactive system 720 is shown to include an exemplary personalized content cloud coordination/interactive system computer 730 with processor 731 and memory 732. The embodiment of FIG. 7 shows that the personalized content cloud coordination computer and the interactive system computer of previous embodiments may be implemented on a single computer in one or more instance. Thus, a computer that interacts with a user may also identify content in a personalized content cloud or on a user device to present to the user as entertainment during pauses in a communications service or while awaiting transfer to an agent at an agent system. The interactive system 720 may entertain the user with content from the user's own personal content account or social media account, or with licensed or owned content from a provider's content that is identified based on the content in the user's own personal content account or information about the content in the user's own personal content account.

In an embodiment similar to the embodiment of FIG. 7, an elevator, known to provide generic predetermined music as background for riders may use a similar system. In an elevator, an application on a user's mobile device may pre-authorize a personalized content coordination computer associated with the elevator to search for content to play and then play the content on the elevator. A transmitter and receiver on the elevator may send and receive signals to the mobile device using, e.g., near field communications, and access a music program to identify the most recent purchases or the most played music. Near field communications are initiated by the user by, e.g., tapping on a device with a near field communications chip and program for communicating. An alternative would be Bluetooth or wireless fidelity (Wi-Fi) as a short-range connective interface mechanism. Using Bluetooth or wireless fidelity communications interfaces, personalized entertainment may be provided without specific input and access authorization from the user, such as when a user has preauthorized content analysis of the content accounts with content stored on or accessed from the user's device. When the coordination system for the elevator detects the presence of the user's device, the coordination system analyzes content and determines content to use for the elevator entertainment based on the content on the user's device. An elevator rider may then be surprised and entertained to hear a most recent purchase, or new music from a favorite entertainer, played on the elevator. The personalized content coordination computer may communicate via the internet with a personalized content cloud to obtain licensed music to play on the elevator. Further, although the speaker system is provided itself on the elevator, the coordination computer that coordinates which music to play may be provided centrally so as to coordinate content playing on multiple different elevators.

In yet another example, such a personalized content coordination computer may be provided in association with a near field communication system, or a Bluetooth or wireless fidelity system at a store or other specific geographic location. Content on a shopper's mobile device may be analyzed, with preauthorization or upon dynamic authorization by the shopper, and the store may entertain all customers with music and/or video content based on the analysis of content on a shopper's device. In this way, shoppers may be entertained with their most recent purchases or their favorite artists or works of art. The computer that coordinates the entertainment for the store may retrieve content to be played from the cloud, or may store content locally and then coordinate content to play based on the analysis of content on shopper's devices. The computer may also have standing instructions of content or artists not to use for entertainment, such as entertainers known to use language considered vulgar by a large part of the population.

Figure 8:
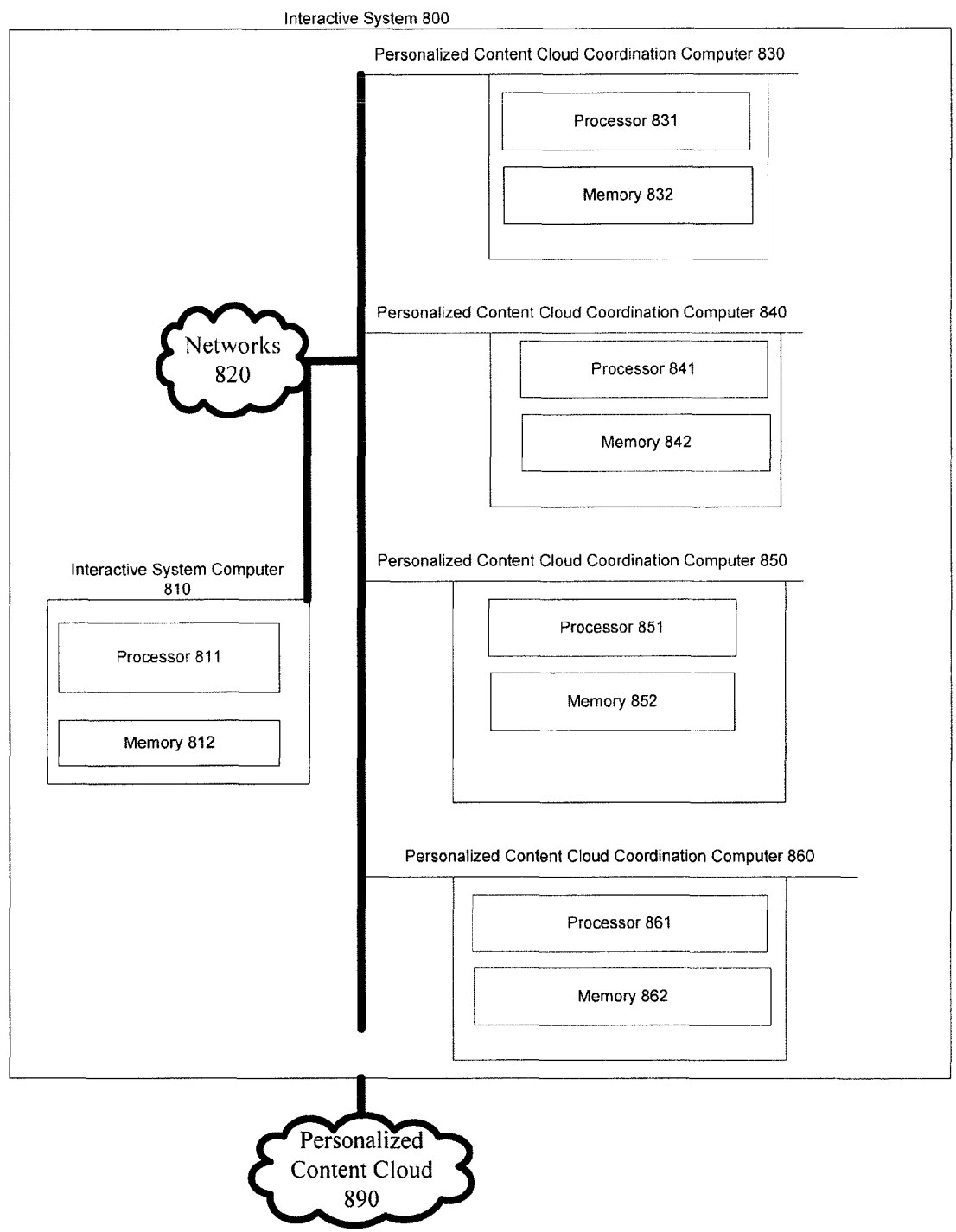
FIG. 8 shows another exemplary system for integrating communications services with personalized content selections and social networks, according to an aspect of the present disclosure.

FIG. 8 shows another exemplary system for integrating communications services with personalized content selections and social networks, according to an aspect of the present disclosure. In FIG. 8, interactive system 800 includes interactive system computer 810 with processor 811 and memory 812 that communicates across networks 820 with multiple personalized content cloud coordination computers 830, 840, 850 and 860. In the embodiment of FIG. 8, personalized content cloud coordination computers 830, 840, 850 and 860 each have respective processors 831, 841, 851 and 861, and respective memories 832, 842, 852, 862. The personalized content cloud coordination computers 830, 840, 850 and 860 communicate with and retrieve content and/or information about content from personalized content cloud 890. In the embodiment of FIG. 8, the personalized content cloud coordination computers 830, 840, 850 and 860 may each independently be responsible for different types of content owned by or licensed to a provider and stored in personalized content cloud 890. The personalized content cloud coordination computers 830, 840, 850 and 860 may also be responsible for coordinating different sessions with users interacting with interactive system computer 810 or other interactive system computers of interactive system 800. In this way, the personalized content cloud coordination computers 830, 840, 850 and 860 may analyze user personal content accounts or social media accounts and determine content to provide to the user as forms of entertainment.

As previously noted, users may be entertained with content from their own account or from the provider's account, including messages to the user or to a group including the user in a user's social media account, music or videos in a user's personal content account, or music or videos identified not in a user's personal content account but identified based on the content in a user's personal content account. For example, a user may be provided with new music from an artist played frequently in the user's account, or a preview of a new television show or movie with an actor or actress in another of the shows in a user's library.

Figure 9:
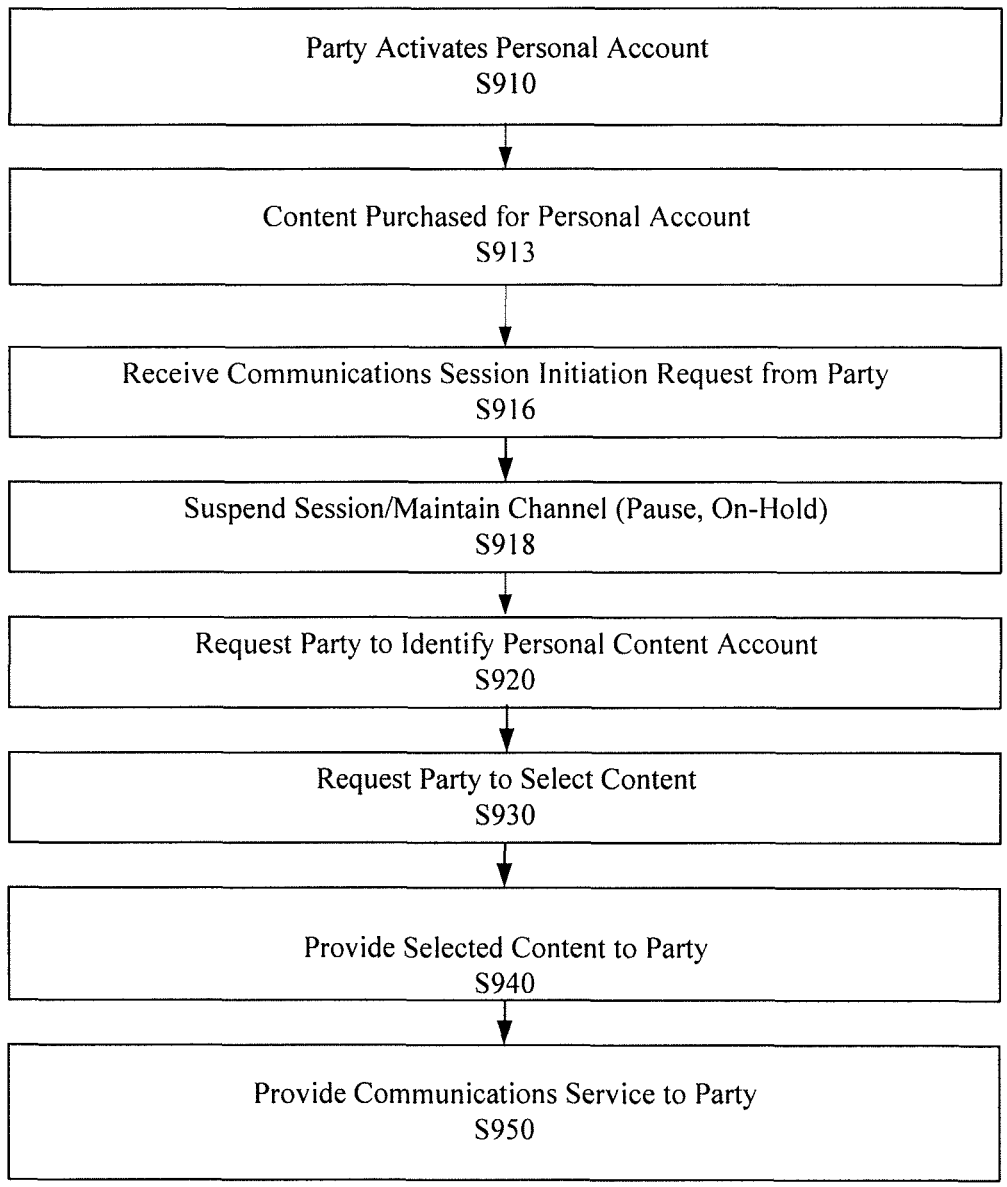
FIG. 9 shows an exemplary process for integrating communications services with personalized content selections and social networks, according to an aspect of the present disclosure.

FIG. 9 shows an exemplary process for integrating communications services with personalized content selections and social networks, according to an aspect of the present disclosure. In FIG. 9, a process begins when a party activates a personal account at S910 and then purchases content for the personal account at S913. S910 and S913 are background steps for the present disclosure, as the embodiments described herein that relate to personal content accounts work on the assumption that a user already has a personal content account with purchased or licensed content before initiating a communication session for a communications service.

At S916, a communications session initiation request is received from a party, and at S918 the session is suspended while the channel with the initiating user is maintained. S916 and S918 correspond in a telephony environment to when a call is received and a party is placed on hold to await assignment of an agent, retrieval of information, or another event in the communications session by which a communications service is provided.

At S920, a party is requested to identify a personal content account. A personal content account as described herein may be a music account such as an iTunes or Spotify account, or another type of media account such as a video Flixter or Youtube account. The party may be asked for a username and password or other required login information so as to access a library of content and information descriptive of content. At S930, the party is requested to select content. As described herein, the content and/or information descriptive of the content in a user's personal content account is analyzed to identify content to play or offer to play to a user as a form of entertainment during pauses in a communications session. The content may be from the user's account, or from the provider's account, and the analysis is performed by the computers 230, 330, 430, 530, 640, 730, 830, 840, 850, and 860 accessing and analyzing the content and/or information descriptive of the content.

At S940, the selected content is provided to the party, and at S950 the communications service is provided to the party. The communications service provided to the party at S950 either begins or is restarted/renewed at S950. Additionally, although the expectation might be that the communications service begins or restarts as soon as possible even if content is interrupted in the middle of being played, the content may be played through to the end before beginning or restarting/renewing the communications service when, for example, the content is "new" to the user such as when the content is from a favorite artist of the user but is not already in the user's library.

Figure 10:
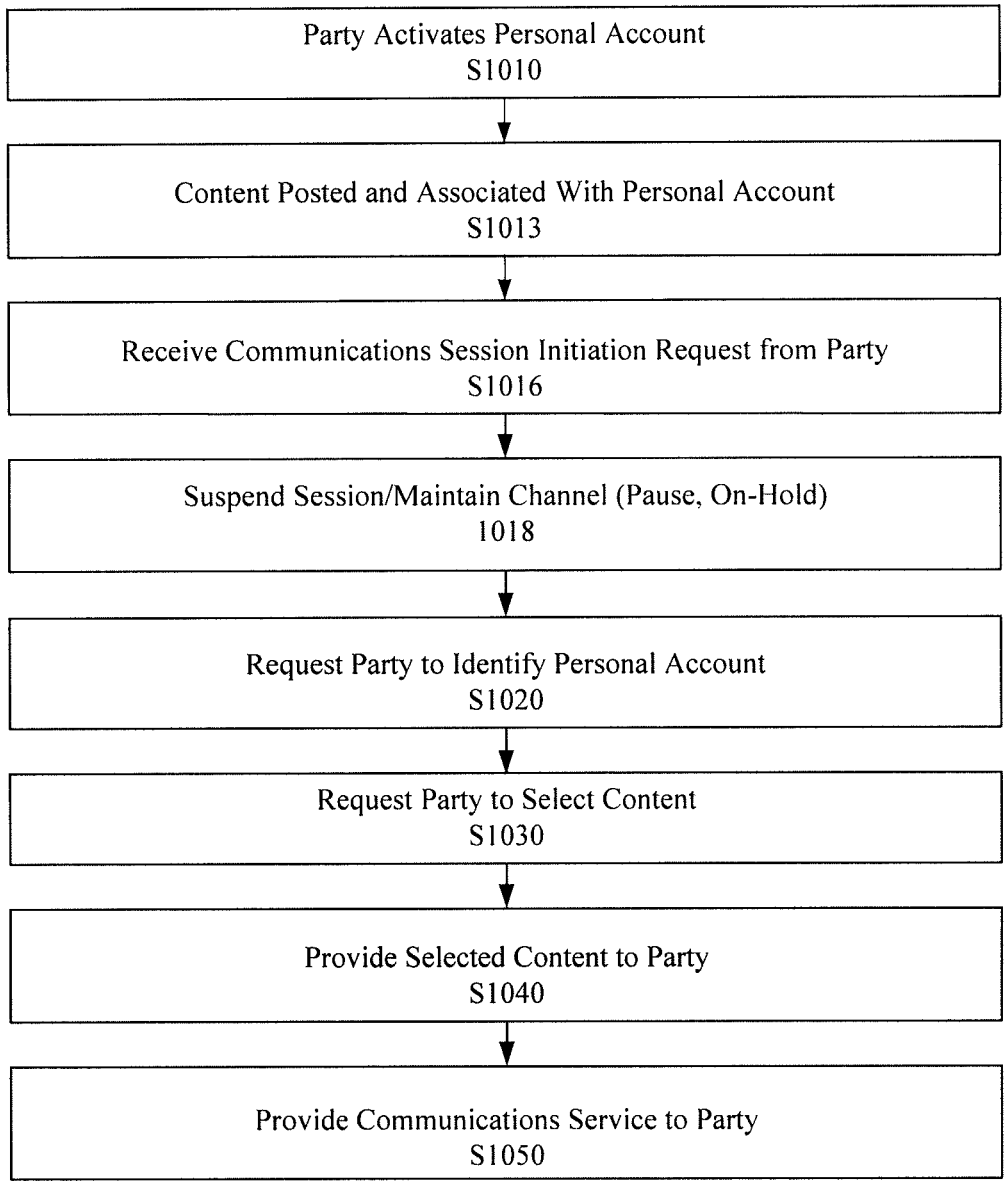
FIG. 10 shows another exemplary process for integrating communications services with personalized content selections and social networks, according to an aspect of the present disclosure.

FIG. 10 shows another exemplary process for integrating communications services with personalized content selections and social networks, according to an aspect of the present disclosure. In the embodiment of FIG. 10, rather than a music account, a social media account is identified and accessed for a user during a communications session so that a user can receive updated information for their social media account before or during breaks in a communications session for a communications service. At S1010, a party activates a personal account and at S1013, content is posted and associated with the party's personal account. An example of such posting is when another party posts a comment or link on the party's "wall". As in the embodiment of FIGS. 9, S1010 and S1013 in the embodiment of FIG. 10 are background steps that occur presumably before or while a party is communicating with a communications service.

At S1016, a communications session initiation request is received from a party, and at S1018 the channel for the communications is maintained as the communications session is suspended. As before, in a telephony environment, the suspension may be an on-hold or other type of pause in a service. At S1020, the party is requested to identify a personal account, in this embodiment a social media account such as a Facebook, MySpace or Linkedin account. At S1030, the party is requested to select content to review, such as wall postings, group messages, individual messages, friend requests, or postings to friends' walls. Upon receipt of the party's selection of content, the selected content is provided to the party at S1040. The content may be provided by, for example, a machine voice reading comments, postings and messages to a user on a telephone. At S1050, the communications service is provided to the party.

Figure 11:
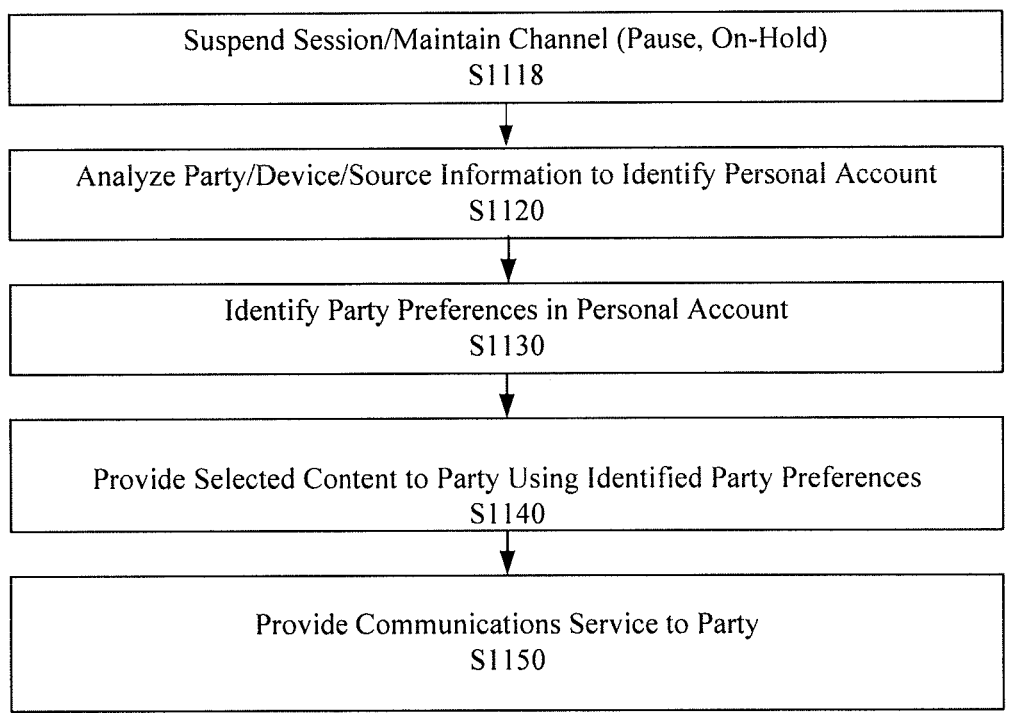
FIG. 11 shows another exemplary process for integrating communications services with personalized content selections and social networks, according to an aspect of the present disclosure.

FIG. 11 shows another exemplary process for integrating communications services with personalized content selections and social networks, according to an aspect of the present disclosure. In FIG. 11, a party identification, device identification and/or source information are analyzed to identify a personal account, rather than requiring the user to provide the personal account. The analysis may be performed using an applet or other form of executable program on or provided to the user's communications device, where the applet or other form of executable program analyzes information on the device to identify personal content accounts and social media accounts. The analysis may also be performed using information provided from the user's communications device to a personalized content cloud coordination computer as described herein, such as when a telephone number or IP address or email address is sent along with the communications request. The information from the user's communications device may then be used to search a social media provider website such as Facebook to determine whether the user has an account with the social media provider.

In FIG. 11, a session is suspended while a channel is maintained at S1118. As in other embodiments described herein, in a telephony environment the suspension of the session may be by placing a call on-hold. At S1120, the party, device and/or source information are analyzed to identify a personal account. At S1130, party preferences in the personal account are identified, such as by asking the party to specify which type of content from a social media account to provide. Alternatively, S1130 may include analyzing a personal content account to identify a user's favorite or most-played music or items marked as favorites or with high ratings. At S1140, selected content is provided to a party using the identified party preferences. As explained for other embodiments, such content may be provided from the user's personal content account or from a provider's content account. The content may either be content that matches content in the user's account, or may be different content that is nevertheless identified based on the content in a user's account such as new music from a user's favorite artist. After the content is provided at S1140, a communications service is provided to the party at S1150 either by beginning or restarting the communications service.

Figure 12:
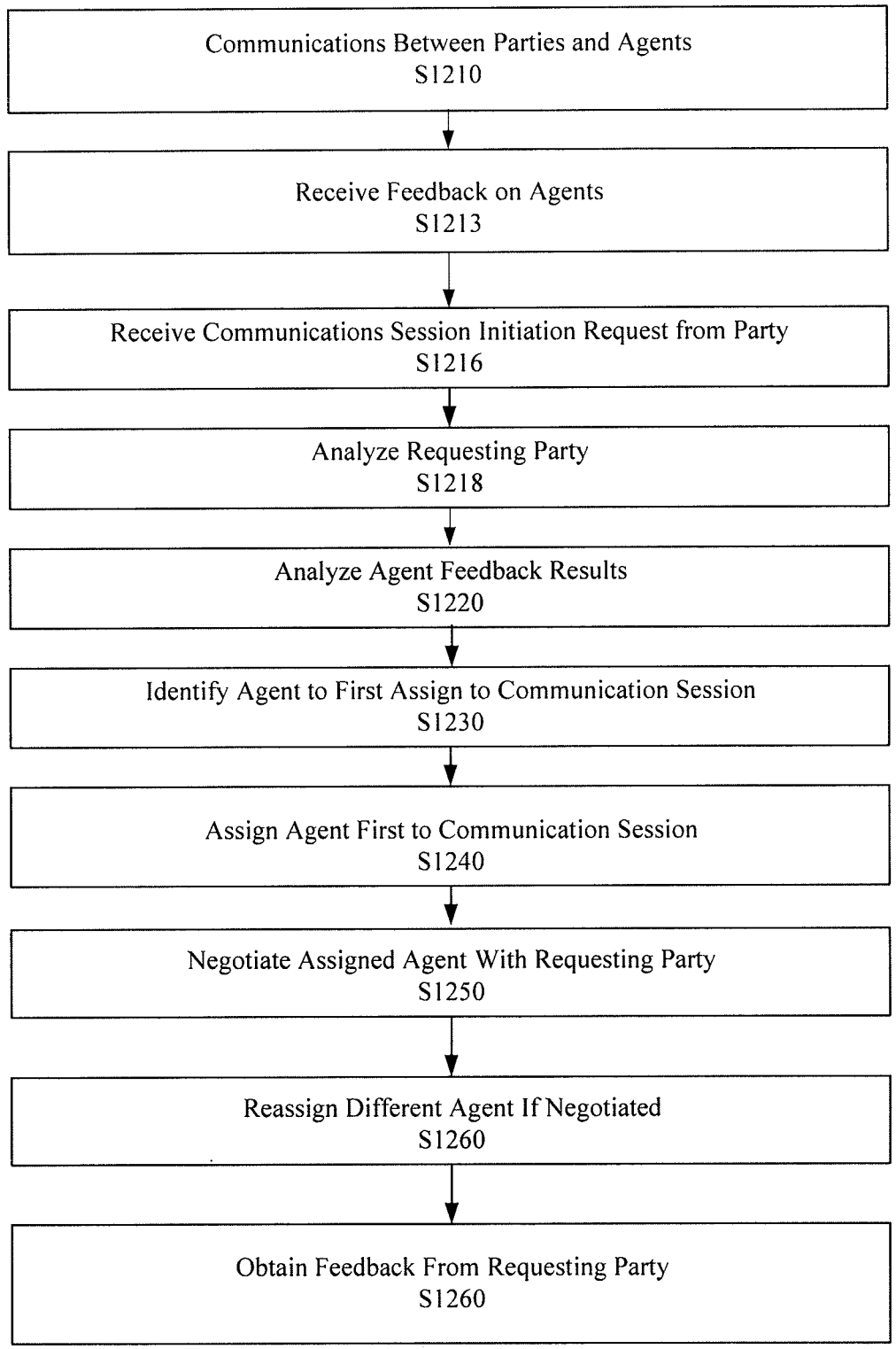
FIG. 12 shows another exemplary process for integrating communications services with personalized content selections and social networks, according to an aspect of the present disclosure.

FIG. 12 shows another exemplary process for integrating communications services with personalized content selections and social networks, according to an aspect of the present disclosure. In FIG. 12, feedback on agents is received and used later to select an agent for a new communications session. At S1210, parties communicate with agents, and at S1213 feedback on the agents is received. The feedback may be reviews, such as numerical ratings or favorable/unfavorable reviews. The feedback is associated with the party that provides the feedback. At S1216 a communications session initiation request is received from a party, and at S1218 the requesting party is analyzed. For example, a party may be analyzed by identifying whether the party belongs to an online social network and, if so, whether any of the party's friends in the social network have previous provided favorable feedback for an agent of the same service provider for the communications service. At S1220, agent feedback results are analyzed, and at S1230 an agent to first assign to a communications session is identified. At S1240, the agent is first assigned to the communications session. At S1250, an interactive system negotiates with the party as to whether the party wishes to wait for the selected agent or if the party wishes to obtain services from the first-available agent. If the party wishes to wait, the party may be entertained as described in other embodiments while awaiting the selected agent. If the first-available agent is requested, the first-available agent is reassigned at S1260 and feedback from the requesting party is obtained at S1260 following the communications service being provided.

Figure 13:
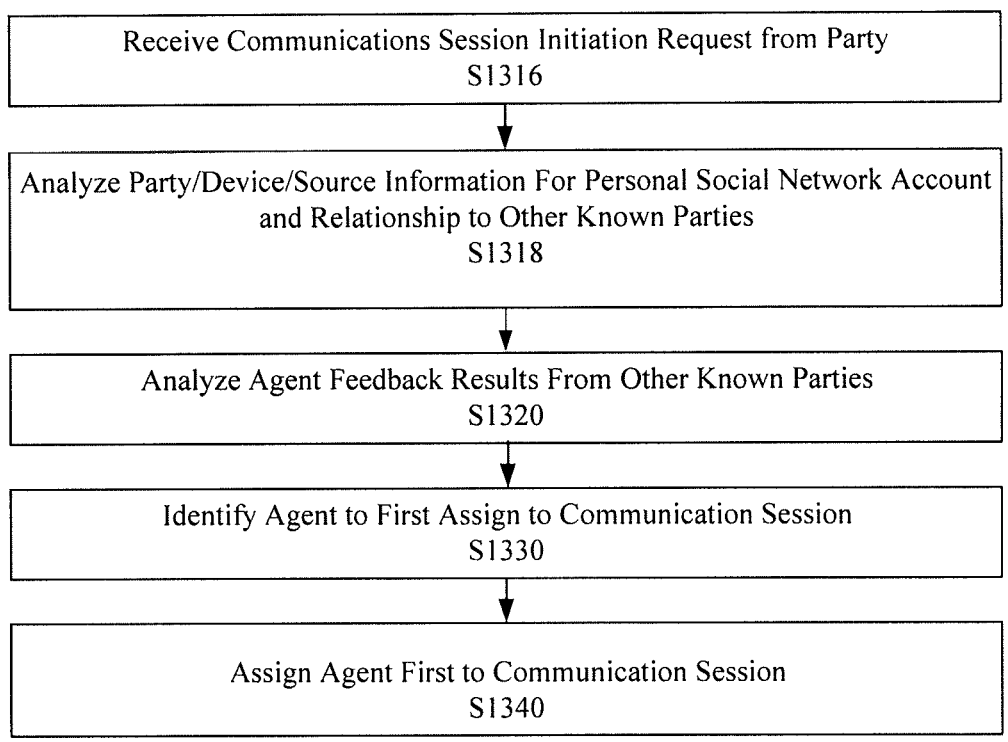
FIG. 13 shows another exemplary process for integrating communications services with personalized content selections and social networks, according to an aspect of the present disclosure.

FIG. 13 shows another exemplary process for integrating communications services with personalized content selections and social networks, according to an aspect of the present disclosure. In FIG. 13, a party, device and/or source information are analyzed to identify a personal social network account and relationship to other known parties, so as to identify the feedback results from other known parties with relationships to the present party in the communications session. At S1316, a communications session initiation request is received from a party, and at S1318 party, device and/or source information are analyzed for personal social network account and relationships to other known parties. At S1320, agent feedback results from other known parties are analyzed to find agents that received favorable feedback from a user's social media friends. At S1330, an agent to first assign to a communications session is identified based on the feedback, and at S1340 the agent is first assigned to the communication session based on the analyzed feedback from the users' social media friends.

Figure 14:
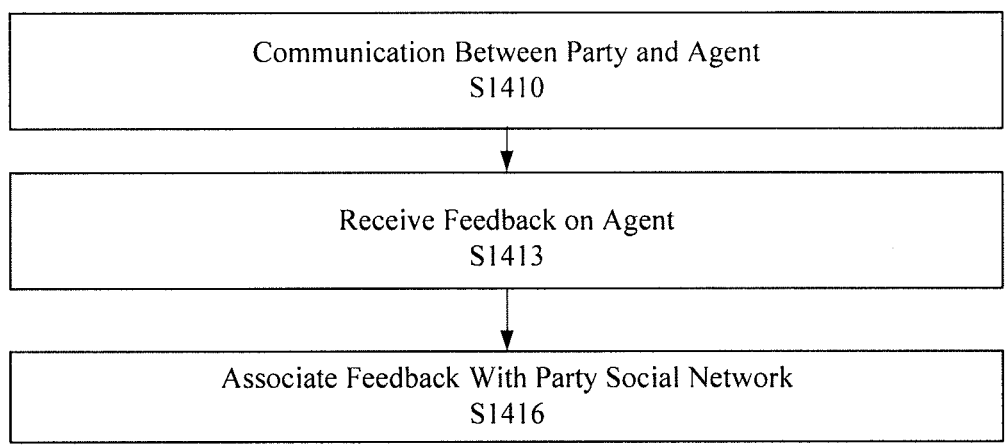
FIG. 14 shows another exemplary process for integrating communications services with personalized content selections and social networks, according to an aspect of the present disclosure.

FIG. 14 shows another exemplary process for integrating communications services with personalized content selections and social networks, according to an aspect of the present disclosure. At S1410, a party communicates with an agent. At S1413, feedback on the agent is received from the party, and at S1416 the feedback is associated with the party's social network account by the interactive system that solicits the feedback. The feedback is then available later for use in selecting agents for the user's friends, either to affirmatively provide an agent with positive feedback to a user's social media friends or to avoid assigning an agent with negative feedback to a user's social media friends.

Although examples herein describe personal content accounts mainly in the context of music accounts given the history of interactive voice response systems in telephony environments, personal content accounts may also have visual content, such as text emails or news articles, that is presentable to a user audibly using a text-to-speech processor of a personalized content cloud coordination computer. Similarly, when the communications session includes visual interaction, such as an internet chat session or a video conference, personalized content to present as entertainment may include images, artwork, video clips or other form is of content that can be selected based on a user's existing personal content account.

Although examples herein describe use of social media accounts to identify personal contacts of a party, address books and other sources of contacts may also be identified and used to find persons who may have previously obtained communications services from a service provider contacted by a user. Records of identified persons can be analyzed to find agents for whom the identified persons provided positive feedback. The current user can then be presented an option to communicate with an agent, if available, for whom a contact has previously provided positive feedback.

In embodiments described herein, analysis of personal content accounts including social media accounts is predicated upon access to the accounts, either through public information or private information. In the event of private information, specific or general authorization of users to access and analyze the accounts may be required, and the coordination computers described herein may then log in to the accounts either in a cloud environment or on a user device. The analysis may be performed by pulling content and information about content back to a coordination computer for analysis, or by sending an analysis program to the cloud or to the user device to perform the analysis. The analysis itself may be as simple as identifying favorite entertainers and/or entertainment and then providing the user a selection based on the identified favorite so that the user can select entertainment before the communications session or during breaks. The analysis may also be a simple search for "new" content that has not yet been reviewed by the user in a social media account, so that the user can be informed of updates while awaiting a service. Thus, user privacy will be respected while also allowing users a chance to make productive or entertaining use of otherwise-unproductive and/or unentertaining time spent obtaining a communications service.

As set forth herein, according to an aspect of the present disclosure, a method for integrating communications services with personalized selections of content includes receiving, at an interactive system of a communications service provider, an initiation request for a communications session from an initiating communications party. A computer of the interactive system determines that the initiating communications party is associated with a personal content account external to the communications service provider. Personalized selections of content from the personal content account are provided to the initiating communications party during the communications session.

According to another aspect of the present disclosure, the method also includes prompting the initiating communications party to access the personal content account.

According to a further aspect of the present disclosure, the method also includes prompting the initiating communications party for permission to access the personal content account and for information required to access the personal content account.

According to yet another aspect of the present disclosure, the personal content account is a music account containing licensed musical content purchased by and owned by an owner of the personal content account.

According to another aspect of the present disclosure, the personal content account is a music account containing selected musical content licensed to a provider of the personal content account.

According to a further aspect of the present disclosure, the personal content account is a social network account of the initiating communications party.

According to yet another aspect of the present disclosure, the personalized selections of content provided to the initiating communications party include a message sent to the initiating communications party in the social network account.

According to another aspect of the present disclosure, the personalized selections of content provided to the initiating communications party include a message sent to a group to which the initiating communications party belongs in the social network account.

According to a further aspect of the present disclosure, the personalized selections of content are provided to the initiating communications party during an on-hold period during the communications session.

According to yet another aspect of the present disclosure, the method further includes accepting a selection of the personalized selections of content from the initiating communications party, and playing the selection of the personalized selections of content to the initiating communications party.

According to an aspect of the present disclosure, a system for integrating communications services with personalized selections of content includes a receiver, at a computer of an interactive system of a communications service provider, that receives an initiation request for a communications session from an initiating communications party. The system also includes a processor of the computer that determines that the initiating communications party is associated with a personal content account external to the communications service provider. The personalized selections of content are provided from the personal content account to the initiating communications party during the communications session.

According to an aspect of the present disclosure, a method for integrating communications services with social networks includes receiving, at an interactive system of a communications service provider, an initiation request for a communications session from an initiating communications party. The method also includes identifying, by a computer of the interactive system and in accordance with feedback received from communications parties based on previous communications between the communications parties and agents of the communications service provider, an agent to assign to the communications session. The method further includes assigning the agent to the communications session first in accordance with the feedback received from the communications parties based on previous communications between the communications parties and agents of the communications service provider.

According to another aspect of the present disclosure, the method also includes soliciting feedback on the performance of the agent first assigned to the communications session from the initiating communications party.

According to yet another aspect of the present disclosure, the feedback includes a rating of the performance of the agent.

According to still another aspect of the present disclosure, the feedback is received from the initiating communications party via a social network.

According to another aspect of the present disclosure, the agent to first assign to the communications session is identified based on feedback received from the initiating communications party based on previous communications between the initiating communications party and agents of the communications service provider.

According to yet another aspect of the present disclosure, the agent to first assign to the communications session is identified based on feedback from other communications parties based on previous communications between the other communications parties and agents of the communications service provider.

According to still another aspect of the present disclosure, the method includes identifying the other communications parties and the feedback from the other communications parties based on an ascertainable relationship between the other communications parties and the initiating communications party in a social network.

According to another aspect of the present disclosure, the method further includes determining whether the initiating communications party is willing to accept a longer wait time in order to wait for the agent first assigned to the communications session to become available.

According to yet another aspect of the present disclosure, the method includes reassigning another agent to the communications session when the initiating communications party is unwilling to accept a longer wait time in order to wait for the agent first assigned to the communications session.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for integrating communications services with personalized selections of content, comprising:
receiving, at an interactive system residing on a network of a communications service provider, an initiation request for a voice-based communications session from an initiating communications party residing on a network different from the communications service provider;
determining, by a computer of the interactive system, that the initiating communications party is associated with a personal content account external to the communications service provider, wherein content in the personal content account of the initiating communications party is a specific song purchased by the initiating communications party before the initiation request for the voice-based communications session, and is preselected by the initiating communications party; and
providing, by the computer of the interactive system, to the initiating communications party during the voice-based communications session, the content-preselected by the initiating communications party from the personal content account.

2. The method according to claim 1, further comprising:
during the voice-based communications session, prompting the initiating communications party to access the personal content account.

3. The method according to claim 1, further comprising:
during the voice-based communications session, prompting the initiating communications party for permission to access the personal content account and for information required to access the personal content account.

4. The method according to claim 1,
wherein the personal content account is a music account containing licensed musical content purchased by and owned by an owner of the personal content account.

5. The method according to claim 1,
wherein the personal content account is a music account containing selected musical content licensed to a provider of the personal content account.

6. The method according to claim 1,
wherein the personal content account is a social network account of the initiating communications party.

7. The method according to claim 1,
wherein the personalized selections of content are provided to the initiating communications party during an on-hold period during the voice-based communications session.

8. The method according to claim 1, further comprising:
accepting a selection of content preselected by the initiating communications party, and playing the accepted selection of the content to the initiating communications party.

9. The method according to claim 1,
wherein the initiating communications party resides on a wireless network and the interactive system resides on a data network.

10. The method according to claim 1,
wherein identification of the personalized selections of content is provided from a provider of the personal content account, but the content itself is provided from a separate content provider.

11. The method according to claim 1,
wherein the personal content account is a website account.

12. The method according to claim 1, further comprising:
identifying an artist of the specific song purchased in the personal content account; and
providing, during the voice-based communications session, another song by the artist of the specific song based on the specific song being included in the personal content account, the other song not yet purchased by the initiating communications party.

13. A system for integrating communications services with personalized selections of content, comprising:
a receiver, at a computer of an interactive system residing on a network of a communications service provider, that receives an initiation request for a voice-based communications session from an initiating communications party residing on a network different from the communications service provider, wherein content in the personal content account of the initiating communications party is a specific song purchased by the initiating communications party before the initiation request for the voice-based communications session, and is preselected by the initiating communications party; and a processor of the computer that determines that the initiating communications party is associated with a personal content account external to the communications service provider, wherein the content preselected by the initiating communications party is provided, by the computer of the interactive system, from the personal content account to the initiating communications party during the voice-based communications session.

14. The system according to claim 13, wherein the processor further identifies an artist of the specific song purchased in the personal content account, and provides, during the voice-based communications session, another song by the artist of the specific song based on the specific song being included in the personal content account, the other song not yet purchased by the initiating communications party.

* * * * *